NOISE ELIMINATING GATE CIRCUIT
Filed Dec. 15, 1958
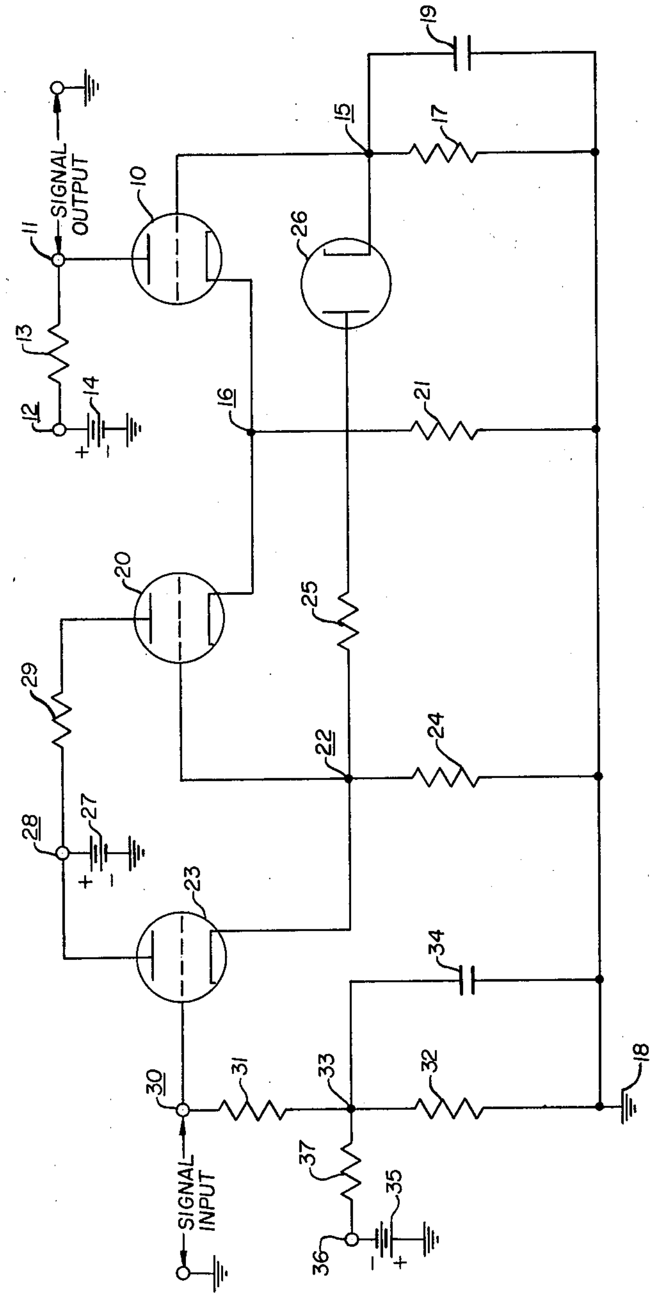
INVENTORS
EUGENE L. MLECZKO
BERNARD L. ELBINGER
BY D. Gordon Angus
ATTORNEY

3,128,435
NOISE ELIMINATING GATE CIRCUIT

Eugene L. Mleczko, Covina, and Bernard Elbinger, Los Altos, Calif., assignors to Aerojet-General Corporation, Azusa, Calif., a corporation of Ohio Filed Dec. 15, 1958, Ser. No. 780,624
9 Claims. (Cl. 328—115)

This invention relates to electronic gate circuits and has for an object to provide an electronic gate circuit which gives an output signal when an operating input signal is present but which discriminates against and is unresponsive to unwanted signals such as repetitive undesired undulations or random noise signals which may also be present.

It is desirable for some purposes to have an electronic gate circuit whose output will not be actuated to produce an operational output signal in response to undesired noise signals. It is accordingly desired that the signal pulse be operable separately from the random noise or other unwanted signal.

The foregoing desired results are carried out according to the present invention by provision of a gate circuit having an input on which the operating signal is to be impressed, and an output from where a signal corresponding to the input signal can be taken. There is provided an input tube or relay and an output tube or relay. Transmission of the desired signal from the input to the output is controlled by a control tube or relay on which signal from the input is impressed. The state of conductivity of the control tube determines the passage of signals to the output.

A feature of the invention resides in the use of a capacitor which is charged to a voltage representative of the positive peak potential of repetitive unwanted signal or noise. This capacitor voltage when applied to a control electrode of the output tube or relay, thereby regulates the conduction of the control tube or relay.

A related feature resides in means providing a low resistance path for charging the capacitor and for isolating the capacitor from shunting effects of the preceding circuit during the period of discharge of the capacitor.

Another feature resides in a cathode follower-tube, which is used to improve the ratio of operating signal to unwanted repetitive signal or noise, and which also provides a zero voltage reference level for the signal supplied to the bias control tube by having its grid biased beyond cutoff.

These and other features will be more fully understood from the following detailed description and accompanying drawing which is a circuit diagram of the device according to this invention.

In the drawing, there is shown a circuit diagram having a circuit output tube 10 which has a circuit output plate terminal 11 connected to the plate of the tube 10 and also connected to a D.C. plate supply terminal 12 through a plate supply resistor 13. A suitable D.C. plate supply 14 is also provided for the circuit output tube 10. The tube 10 has a grid terminal 15 and a cathode terminal 16. A suitable resistor 17 to ground 18, from the grid terminal 15, is provided. In parallel with the resistor 17, a capacitor 19 is provided.

The cathode terminal 16 of the circuit output tube 10 is connected to the cathode of a bias control tube 20. A resistor 21 to ground is provided from the common cathode terminal 16 of the tubes 10 and 20. The grid of tube 20 has a grid terminal 22.

A cathode follower tube 23, which supplies the grid of the control tube 20 and also charges the capacitor 19, has a load resistor 24 to ground in its cathode circuit. The grid terminal 22 for the bias control tube 20 is connected directly to the cathode of the cathode follower tube 23 so that the grid of the tube 20 is provided with the voltage output across the load resistor 24 of the cathode follower tube.

The capacitor 19 is charged by being connected to the cathode of the cathode follower tube 23 at the terminal 22 by means of a resistor 25 connected to the plate of a tube 26 which has a cathode connected to the terminal 15 connected to the capacitor 19.

The bias control tube 20 and the cathode follower tube 23 are provided with a suitable D.C. plate supply 27 connected to a common plate supply terminal 28. A resistor 29 is provided in the plate circuit of the tube 20.

The cathode follower tube has a circuit input grid terminal 30 conected to its grid. Two resistors in series 31 and 32 with an interconnecting terminal 33 are electrically situated between the circuit input terminal 30 and the grid of tube 23, and the ground 18. A capacitor 34 to ground 18 is also provided which is connected to the terminal 33 electrically in parallel with the resistor 32. A suitable D.C. bias supply 35 for the grid of tube 23 is connected to a D.C. bias supply terminal 36 which is connected to the terminal 33 in the grid circuit of the cathode follower tube by means of a suitable grid supply resistor 37.

Suitable electrical components of a typical circuit of this invention are as follows:

(1) For the tubes 10, 20, 23 and 26: ½–12AU7, ½–12AU7, ½–12AU7, and ½–6AL5, respectively;

(2) For the D.C. supplies 14, 27 and 35: +270 volts, +67.5 volts and −22.5 volts, respectively;

(3) For the capacitors 19 and 34: 0.1 microfarad and 0.47 microfarad, respectively;

(4) For the D.C. supply series resistors 13, 29 and 37: 22,000 ohms, 33,000 ohms, and 68,000 ohms, respectively;

(5) For the cathode resistors 21 and 24: 4,700 ohms and 10,000 ohms, respectively;

(6) For the grid resistors 17, 31 and 32: 4,700,000 ohms, 220,000 ohms, and 33,000 ohms, respectively; and (7) For the series plate resistor 25 of the tube 26: 470,000 ohms.

It should be understood that the foregoing values and specifications are given only for illustration and not by way of limitation.

To place the circuit of this invention in operation, power is first supplied to the circuit elements by the D.C. supplies 14, 27 and 35. The D.C. grid supply 35 for the tube 23 biases the grid of the tube 23 beyond cutoff. By means of such a bias only that portion of input to the tube 23 that causes the tube to conduct will be represented at the output of the tube 23.

An input signal, comprising an operating signal of a certain peak amplitude value and which may contain an unwanted repetitive signal or noise of lesser amplitude, is supplied to the circuit between the circuit input terminal 30 and ground. Since the mathematical ratio of the operating signal considered with respect to unwanted repetitive signal or noise amplitude is assumed to be greater than unity, the biasing of the tube 23 negatively beyond cutoff increases this ratio, since only that portion of the signal and/or noise that causes the tube to conduct will be present at the output of tube 23. The ratio of operating signal-to-noise amplitude is, by means of the grid biased beyond cutoff, therefore improved at the tube 23. The tube 23 connected as a cathode follower provides a zero-voltage reference level for the signal because of the normally cutoff condition of this tube. The output voltage of the cathode follower tube 23 is provided directly from across the cathode load resistor 24 at the terminal 22 to the grid of the bias control tube 20, which controls the bias of the circuit output tube 10 in a manner explained below.

The output of the cathode follower tube is also fed to the capacitor 19 which is thereby charged. The capacitor 19 receives a charge by way of the terminal 22 through the resistor 25 connected to the plate of the diode 26. The diode 26 provides a low resistance for charging the capacitor 19 and serves to isolate the capacitor from the shunting effects of the preceding circuit during the discharge period of the capacitor. The capacitor 19 will charge to the positive peak potential of the unwanted repetitive signal or noise, thus making the signal discriminatory action of the circuit insensitive to relative rapid changes of noise level. Because of the time constant of the combination resistor 25 and capacitor 19, several successive cycles of unwanted signal or noise are required to charge the capacitor 19 to approximately the peak value of random peaks of unwanted signal or noise.

The signal discriminating action of the circuit is achieved by applying the voltage appearing on the capacitor 19 to the grid of the circuit output tube 10, thereby regulating the point of conduction on the bias control tube 20 due to the cathode coupling between the tubes 10 and 20 at the terminal 16. With zero bias on the tube 10 relative to its cathode, the current drawn through the resistor 21 by the tube 10 is such as to cause point 16 to be more positive than point 22, so that the grid of tube 20 is biased negatively relative to its cathode, slightly beyond cutoff, so that tube 20 is blocking.

The capacitor 19 will charge to approximately the peak value of random peaks of noise. Therefore any abrupt increase in peak amplitude of the signal, comprising both desired operating signal and undesired noise, fed into the circuit at 30 will abruptly increase the current through resistor 24, making point 22 more positive; and this will occur before any change of current through resistor 21 occurs because condenser 19 has not had time to charge up further. This will result in conduction by the bias control tube 20 because its grid is now less negative relative to the cathode. In other words, any signal appearing at the grid of the tube 20 must be greater in peak amplitude than the peak value of the noise in order to allow the signal at the grid of the tube 20 to be passed, and the signal that is passed represents desired operating signal.

When the bias control tube 20 conducts, the increased current through the resistor 21 will result in the circuit output tube 10 being biased more negatively relative to its cathode because point 16 is now more positive. This more negative bias will decrease the anode current through resistor 13 and increase the positive potential at output terminal 11. Thus the change of bias gives rise to a positive going signal at the output terminal 11 connected to the anode of the tube 10. Therefore any signal applied at input terminal 30 to the grid of the cathode follower tube 23 whose peak value is greater than the peak value of the noise level, will produce at the output terminal 11 a signal having an amplitude which represents the difference between the peak values of the noise level and the desired operating signal.

If a triggered circuit is connected from the output terminal 11 to ground, it will trigger or respond to the plate output of the tube 10 when the desired operating signal amplitude reaches the definite value at which the particular triggered circuit used is designed to respond. Such a triggered circuit in turn may energize a relay, or the like, which relay by means of its multiplicity of contacts may control the actuation of other mechanisms whose operation is dependent upon a signal in the presence of noise which is introduced into the noise discriminating gate circuit of this invention at the input terminal 30.

The circuit of this invention, with the use of relatively few electrical components, separates signal pulses from lesser amplitude unwanted repetitive signal or noise. It will serve the purpose of nearly instantaneously separating such signal pulses in any application where such action is required. Such a circuit, which is simple and relatively inexpensive, is especially useful for controlling the automatically controlled systems in many civilian applications, such as factory conveyor lines, or other manufacturing operation control, or in the numerous automatically controlled systems required in military applications.

The parts used in the circuit are relatively rugged in present day development, and they are also few in number, light in weight, and also inexpensive, making this circuit readily adaptable to many uses both from an economic and engineering standpoint.

In passing it is pointed out that many obvious variations such as sensitivity control of the gate circuit or variations of operating devices for using the output signal may be devised for this circuit. For example, sensitivity control may be provided by a potentiometer located prior to the input terminal 30, which could control the sensitivity of the noise discriminating circuit through a voltage divider action.

While only one preferred embodiment of our invention has been shown and described in detail, it is our desire that the invention shall not be limited to this particular embodiment, but that the invention shall only be limited in accordance with the scope of the appended claims, since persons familiar in the art may devise other embodiments still within the limitations of said claims.

What is claimed is:

1. An electronic gate circuit operable by an operating signal in the presence of undesired random signals of lesser amplitude than the operating signal, comprising an input relay having a cathode, anode and control electrode, an output relay having a cathode, anode and control electrode and a bias control relay having an anode, cathode and control electrode for controlling the bias on the cathode electrode of the output relay, said control relay having its input connected to receive the output from the input relay and having a resistor in its output circuit included in the cathode electrode circuit of said output relay to control the bias on the last-mentioned cathode electrode, a second resistor in the circuit of the output relay control electrode, a charging condenser shunting said second resistor, and means for charging said condenser from the output of said input relay by the voltage of the random signals or noise at the output of said input relay, whereby the bias on said output relay control electrode is controlled by said second resistor with a delay determined by the time constant of said second resistor and said condenser, the bias on the control electrode of the control tube being beyond cutoff in the absence of operating signal.

2. An electronic gate circuit for responding to an operating signal in the presence of undesired random signals of lesser but varying amplitude than said operating signal, comprising a pair of cathode-coupled tubes, one of which is an output tube having a control electrode and the other of which is a control tube having a control electrode, said control tube controlling the bias on the control electrode of said output tube, means automatically applying a voltage representative of the amplitude of said undesired varying signal to the control electrode of said output tube, and means for applying signals to the control electrode of said control tube.

3. An electronic gate circuit for separating desired signals from unwanted signals comprising a cathode follower tube and a pair of cathode-connected tubes each having an anode, cathode and control grid, a grid resistor connected in the grid circuit of one of said tubes, a cathode resistor connected to the common-connected cathodes of said tubes in series with said grid resistor, the grid of the other one of said cathode-connected tubes being connected in the output circuit of said cathode follower tube, a capacitor connected in parallel with said grid resistor, and a diode, said grid resistor being connected across the output of said cathode follower tube through said diode.

4. An electronic gate circuit operable by an operating signal in the presence of undesired random signals of lesser amplitude than the operating signal, comprising a first, a second and a third relay connected in tandem in the order named, each of said relays having an input electrode, and an output electrode, and the third relay having a control electrode, means for impressing an operating signal on the input electrode of the first of said relays, a resistor in the output circuit of the second of said relays and in the input electrode circuit of the third of said relays, a second resistor in the said control electrode circuit, a condenser shunting said second resistor, and means for charging said condenser from the output circuit of said first relay by voltage of the random signals, whereby the bias on said control electrode is controlled by said second resistor with a delay determined by the magnitudes of said second resistor and said condenser.

5. An electronic gate circuit for separating operating signals of greater amplitude from unwanted signals of lesser but varying amplitude comprising a pair of cathode-coupled tubes, means for automatically applying a voltage representative of amplitude of unwanted signal to the grid of the first of said cathode-coupled tubes, means for applying signals to the grid of the second of said cathode-coupled tubes, the second of said cathode-coupled tubes being biased slightly beyond cutoff due to current through the common cathode coupling of said two tubes, whereby when said first tube conducts, said second tube thereby becomes conductive for grid signals having an amplitude greater than the amplitude of said unwanted signals, the conduction of said second tube thereby biasing said cathode-coupled first tube more negatively so as to have a plate output of said first tube representative of difference in amplitude of operating signals of greater amplitude and unwanted signals of lesser amplitude.

6. Apparatus according to claim 5 in which said means for applying signals to the grid of said second tube comprises a cathode follower tube, the output of which is applied directly to the grid input of said second tube.

7. Apparatus according to claim 5 in which said means for applying a voltage to the grid of the first of said cathode-coupled tubes comprises a slow-charging capacitor means requiring several cycles of unwanted signal to charge it fully to the peak voltage level of unwanted signal.

8. Apparatus according to claim 7 in which said capacitor means comprises: a capacitor, and a charging current path means to said capacitor comprising a resistor and a tube having a tube plate connected to said resistor and a tube cathode connected to said capacitor, said resistor being so disposed and arranged as to be connected in series, electrically between said means for applying signals to the grid of said second tube and said tube having a plate connected to said resistor, whereby said resistor and said tube having a tube plate and a tube cathode comprise said charging current path means to said capacitor for the purpose of isolating said capacitor from preceding circuit components during discharge periods of said capacitor.

9. An electronic gate circuit for separating greater amplitude operating signals from lesser amplitude unwanted signals comprising a pair of cathode-coupled tubes, a grid resistor connected to a first of said tubes, a capacitor connected electrically in parallel with said grid resistor, a cathode resistor connected to the two coupled cathodes of said tubes, a cathode follower tube, the grid of the second of said cathode-coupled tubes being connected directly to the cathode output of said cathode follower tube, a fourth tube, a resistor connected electrically to the plate of said fourth tube, said resistor connected to the plate of said fourth tube being connected electrically to the cathode of said cathode follower tube, said fourth tube cathode being connected electrically to the grid terminal side of said capacitor, whereby the output of said cathode follower tube is fed to said capacitor by way of said fourth tube and the plate connected resistor, thereby charging said capacitor to the peak amplitude of unwanted signal, and also thereby isolating said capacitor from shunting effects of the circuit preceding said fourth tube, the voltage of said charged capacitor being applied as bias to the grid of said first tube having said grid resistor in parallel with said capacitor, said second tube cathode coupled to said capacitor biased first tube thereby having conduction of said second tube regulated due to said common cathode coupling, whereby said second tube which is cathode coupled to said capacitor biased first tube is thereby regulated so as to be biased slightly beyond cutoff of said second tube, said second tube so biased beyond cutoff thereby conducting on abrupt increases in peak amplitude of signals to the grid of said second tube representative of operating signal amplitude above peaks of amplitude of unwanted signal, said first capacitor biased tube thus being biased more negatively due to said common cathode coupling and current drawn through said common cathode resistor, thereby giving rise to a positive going signal output at the plate of said first tube representative of operating grid signal input to said cathode follower tube, said unwanted signal of lesser amplitude thereby being eliminated by said electronic gate circuit.

References Cited in the file of this patent

UNITED STATES PATENTS

| | | |
|---|---|---|
| 2,578,273 | Wachtell | Dec. 11, 1951 |
| 2,586,190 | Wasmansdorff | Feb. 19, 1952 |
| 2,679,588 | Henry | May 25, 1954 |
| 2,821,202 | Russell | Jan. 28, 1958 |
| 2,833,922 | Gerks | May 6, 1958 |
| 2,870,328 | Pomeroy | Jan. 20, 1959 |
| 2,951,987 | Longmire | Sept. 6, 1960 |

OTHER REFERENCES

Electronic Designers Handbook, Landee et al., McGraw-Hill, 1957; Sec. 12, page 19 relied on.